Patented Sept. 28, 1954

2,690,389

UNITED STATES PATENT OFFICE 2,690,389

LIME-TREATED DIATOMACEOUS EARTH AS A PARTING AGENT FOR AMMONIUM NITRATE

Merton L. Studebaker, Bartlesville, Okla., assignor to Phillips Petroleum Company, a corporation of Delaware No Drawing. Application August 31, 1951, Serial No. 244,735

7 Claims. (Cl. 71—64)

1

This invention relates to fertilizers. In one of its more specific aspects it relates to fertilizers containing ammonium nitrate in which the ammonium nitrate particles are coated with diatomaceous earth.

Ammonium nitrate has enjoyed wide use as a fertilizer because of its high nitrogen content and the ready availability of the nitrogen. One difficulty experienced in its use, however, is its tendency to cake, or set, under conditions of shipping and storage. The pressure under which it is stored and fluctuating temperature and humidity conditions are the principal causes of this caking. One of the requirements of any fertilizer is that it must be in condition to be distributed satisfactorily from a fertilizer distributor.

Many attempts have been made to overcome this caking tendency including treatments with waterproofing or moisture repelling agents such as resins, soaps, waxes and the like. Another method employed has been the addition of diatomaceous earth to the ammonium nitrate.

This invention involves the treatment of the diatomaceous earth used as a parting agent for ammonium nitrate fertilizer. The diatomaceous earth functions as a parting agent due to its high absorptive capacity. I have found that this absorptive capacity is increased when the diatomaceous earth has been subjected to a preliminary lime treatment. This treatment increases the settled volume and the absorptive capacity is proportional to this settled volume.

By at least one of the aspects of this invention one or more of the following objects will be obtained.

An object of this invention is the preparation of an improved fertilizer.

A further object of this invention is the production of a fertilizer which is readily free flowing and shows little or no tendency to cake under adverse storage conditions.

A still further object of this invention is to provide a method for the utilization of an improved lime-treated diatomaceous earth parting agent.

Other objects and advantages of this invention will become apparent to one skilled in the art, upon reading this disclosure.

In one embodiment of my invention a commercial diatomaceous earth (Dicalite 109-3, produced by the Dicalite Division of the Great Lakes

2

Carbon Corporation) is treated with the lime solution and then used as a conditioning agent for ammonium nitrate. The lime solution used for the treatment of this diatomaceous earth is varied in concentration from an unsaturated solution up to a slurry in which more lime is used than will go into solution. In general, it is preferable to operate with an approximately saturated solution. When the lime solution has been prepared the diatomaceous earth is added, the amount of diatomaceous earth being preferably approximately that of the lime. In general, this range can be set forth as 1 part of diatomaceous earth to from 0.25 to 1 part lime. Another method is to mix the diatomaceous earth and the lime and to add this mixture to the solvent.

The reaction time, of course, will vary in proportion to the temperature. Where no external heating is employed several hours will be required for a completion of the reaction. Preferably, the solution is boiled under atmospheric conditions and then the total time required will be from about one to about four hours. Inasmuch as this reaction time will vary in proportion to the temperature, it should be stated, that the reaction will be continued until the point at which the settled volume of the diatomaceous earth is increased.

The measurement of this settled volume can be determined by using a standard volume of the solution and allowing it to settle in a graduate. By means of this treatment the settled volume will be increased many fold, often as high as ten times the settled volume of untreated diatomaceous earth.

Following the completion of the treatment with the lime solution, the mixture is filtered and the residue is washed so as to remove any excess lime. This can be determined by testing the pH of a slurry of the material. The amount of lime used should be such that the final pH is not over 11.17 and is preferably 9 or less. Following the washing the material is dried and pulverized. This lime treated diatomaceous earth is now suitable for use as a parting agent for ammonium nitrate fertilizer.

Two well known processes are used for the production of $NH_4NO_3$: the high-pan or graining process and the prilling process. In the graining process $NH_4NO_3$ is formed into grains by crystallizing a 98% NH₄NO₃ melt at a temperature in the order of 300° F. This is done in a kettle equipped with rotating plows. In order to prevent caking, this material has been coated with a mixture of natural resin, paraffin and petrolatum followed by mixing the coated product with a small proportion of diatomaceous earth.

The ammonium nitrate which is to be used in this invention is produced in the prilling or Welland process. In this process the NH₄NO₃ is sprayed into an upright chamber and solidifies while falling through this chamber forming prills of a diameter of approximately one or two millimeters. Following further cooling and drying, the parting agent is added as a coating by rolling the prills and the agent together. The amount of coating agent will vary from about 1½ per cent to 5 per cent, and should be employed in a minimum amount which will give satisfactory results. This coating will usually be in the range of 3 per cent to 4 per cent. Ammonium nitrate fertilizer coated with this lime-treated diatomaceous earth will exhibit anti-caking properties superior to ammonium nitrate in which untreated diatomaceous earth is used as a coating agent.

One specific formulation that I have used consists of mixing one part diatomaceous earth, one part calcium oxide and one hundred parts water. This mixture was boiled for three hours and then the diatomaceous earth filtered off. After thoroughly washing the residue it was dried at 110° C. and pulverized to smaller than two hundred mesh particles. The bulk density and pH of the lime-treated diatomaceous earth were 12.8 pounds per cubic foot and 11.17, respectively, as compared to values of 9.4 pounds per cubic foot and 8.83, respectively, for untreated diatomaceous earth.

In order to test the conditioning agent, samples of ammonium nitrate prills were coated with the diatomaceous earth by rolling the prills and coating agent in a 7 x 3¼" diameter bottle for 40 minutes at 100 R. P. M. and then subjected to cyclic temperature storage tests. The resultant ammonium nitrate was stored in polyethylene bags under 12 p. s. i. g. pressure for six days while maintaining the temperature at 100° F. with 40 per cent relative humidity and at 80° F. with 75 per cent relative humidity for alternate twenty-four hour periods. The cakes formed were then removed, dried for two days at 50° C. (122° F.) and then their crushing strengths determined. Relative crushing strengths are used as a direct measure of caking tendency.

As a control for these tests, untreated diatomaceous earth of the same type was used. The efficiency of the parting agent is calculated by dividing the average crushing strength of cakes containing the material into the average crushing strength of cakes containing untreated diatomaceous earth and multiplying the results by one hundred. The results of these tests are shown in the following table:

| Conditioning Agent | Percent Agent on Prills | Percent Moisture in Agent | Average Crushing Strength, p. s. i. g. on Cakes | Efficiency as Conditioning Agent (Based on Untreated Dicalite=100) |
|---|---|---|---|---|
| Lime-Treated Dicalite 109-3 | 3.5 | 3.7 | 26 | 376 |
| Untreated Dicalite 109-3 | 3.5 | 3.5 | 98 | 100 |

Examination of this table makes it clear that lime-treatment results unexpectedly in an efficiency which is almost four times the efficiency of untreated diatomaceous earth. Thus, it is possible to reduce the amount of diatomaceous earth used or to obtain better storing qualities using the same amount of diatomaceous earth. The obvious advantage of reduction in the amount of parting agent used is that the amount of nitrogen in the fertilizer can be kept at the higher limits because the actual amount of ammonium nitrate is greater. At this time it should be pointed out that the amount of lime used in the treatment of a diatomaceous earth should be controlled so that the reaction between the ammonium nitrate and the lime in the diatomaceous earth will be minimized. Excess lime will cause the liberation of ammonia, resulting in a reduction of the nitrogen content of the fertilizer.

While the invention has been described in connection with a present, preferred embodiment thereof, it is to be understood that this description is illustrative only and is not intended to limit the invention. Various modifications will be apparent to one skilled in the art upon study of this disclosure. It is believed that such modifications are within the spirit and the scope of this invention.

I claim:

1. A process of producing a coating for prilled NH₄NO₃ comprising boiling at substantially atmospheric pressure from 1 to 4 hours diatomaceous earth with an aqueous solution of lime in the proportion of one part of diatomaceous earth to from 0.25 to one part by weight lime, removing and washing the diatomaceous earth to remove excess lime, drying and adding said diatomaceous earth to NH₄NO₃ particles.

2. The process of claim 1 in which said treated diatomaceous earth is present in an amount from 1.5% to 5% by weight based upon the NH₄NO₃.

3. The process for reducing the caking of prilled NH₄NO₃ comprising boiling at substantially atmospheric pressure from 1 to 4 hours diatomaceous earth in an aqueous lime solution in a proportion of approximately one part diatomaceous earth to one part lime to 100 parts water, washing to remove excess lime, drying and pulverizing said diatomaceous earth to from 300 to 100 mesh, and adding from 1.5 to 5% by weight of said diatomaceous earth to NH₄NO₃ prills.

4. The process of claim 3 in which said diatomaceous earth is present in an amount of from 3 per cent to 4 percent.

5. The process for reducing the caking of prilled NH₄NO₃ comprising boiling at substantially atmospheric pressure from 1 to 4 hours diatomaceous earth in an aqueous lime solution in a proportion of approximately one part diatomaceous earth to one part lime to 100 parts water, washing to remove excess lime, drying and pulverizing said diatomaceous earth to smaller than 100 mesh, and adding from 1.5 to 5% by weight of said diatomaceous earth to NH₄NO₃ prills.

6. The process of reducing the caking tendencies of NH₄NO₃ particles comprising the steps of immersing diatomaceous earth in a solution of lime at a temperature up to boiling for a time of at least one hour and sufficient to increase the settled volume and the absorptive capacity of said treated diatomaceous earth, removing excess lime, drying said diatomaceous earth, and coating said NH₄NO₃ particles with said treated diatomaceous earth.

7. The process of claim 6 in which said diatomaceous earth is present in an amount of from 3 per cent to 4 per cent.

References Cited in the file of this patent

UNITED STATES PATENTS

| Number | Name | Date |
|---|---|---|
| 1,263,363 | Bergve et al. | Apr. 23, 1918 |
| 2,008,469 | Prince | July 16, 1935 |
| 2,098,762 | Schmidt | Nov. 9, 1937 |
| 2,399,987 | Cordie et al. | May 7, 1946 |
| 2,423,686 | Cummins | July 8, 1947 |
| 2,584,148 | Mills | Feb. 5, 1952 |

FOREIGN PATENTS

| Number | Country | Date |
|---|---|---|
| 359,163 | Great Britain | July 14, 1931 |
| 544,675 | Great Britain | Sept. 12, 1941 |

OTHER REFERENCES

Industrial and Eng. Chem., Production of Grained Ammonium Nitrate Fertilizer, vol. 38, No. 7, July 1946, pages 709–718.